United States Patent
Sun et al.

(10) Patent No.: US 10,594,453 B2
(45) Date of Patent: Mar. 17, 2020

(54) METHOD AND APPARATUS FOR TRANSMITTING AND RECEIVING PREAMBLE BASED REFERENCE SIGNAL

(71) Applicant: Samsung Electronics Co., Ltd., Suwon-si (KR)

(72) Inventors: Pengfei Sun, Beijing (CN); Bin Yu, Beijing (CN); Dalin Zhu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 15/562,379

(22) PCT Filed: Apr. 6, 2016

(86) PCT No.: PCT/KR2016/003566
§ 371 (c)(1),
(2) Date: Sep. 27, 2017

(87) PCT Pub. No.: WO2016/163732
PCT Pub. Date: Oct. 13, 2016

(65) Prior Publication Data
US 2018/0287753 A1   Oct. 4, 2018

(30) Foreign Application Priority Data

Apr. 8, 2015   (CN) .......................... 2015 1 0163486
Feb. 18, 2016   (KR) ........................ 10-2016-0019013

(51) Int. Cl.
*H04L 5/00* (2006.01)
*H04L 27/26* (2006.01)
*H04L 25/02* (2006.01)

(52) U.S. Cl.
CPC .......... *H04L 5/0048* (2013.01); *H04L 27/264* (2013.01); *H04L 27/2613* (2013.01); *H04L 27/2698* (2013.01); *H04L 25/0202* (2013.01)

(58) Field of Classification Search
CPC . H04L 5/0048; H04L 27/264; H04L 27/2613; H04L 27/2698; H04L 25/0202
See application file for complete search history.

(56) References Cited

U.S. PATENT DOCUMENTS

2012/0127952 A1\*   5/2012   Tong .................... H04B 7/0408
                                                            370/330
2013/0315342 A1   11/2013   Um et al.
(Continued)

FOREIGN PATENT DOCUMENTS

| CN | 101521642 A | 9/2009 |
| CN | 103281265 A | 9/2013 |

(Continued)

OTHER PUBLICATIONS

Faouzi Bader and Musbah Shaat, Pilot Pattern Adaptation and Channel Estimation in MIMO WiMAX-like FBMC System, 2010 Sixth International Conference on Wireless and Mobile Communications. (Year: 2010).*

(Continued)

*Primary Examiner* — Pao Sinkantarakorn
*Assistant Examiner* — Kabir U Jahangir

(57) ABSTRACT

The present disclosure relates to a pre-5th-Generation (5G) or 5G communication system to be provided for supporting higher data rates Beyond 4th-Generation (4G) communication system such as Long Term Evolution (LTE).
The application discloses methods and apparatuses for transmitting and receiving a preamble based reference signal. The method for transmitting a preamble based reference signal comprises: generating a main preamble sequence; generating an auxiliary preamble sequence, wherein, on a predefined resource, a synthesized signal of the main preamble sequence and the auxiliary preamble sequence is equal to a predefined preamble based reference signal; and transmitting the main preamble sequence and the auxiliary preamble (Continued)

sequence based on a filter-bank multi-carrier modulation. According to the embodiments of the application, the main preamble sequence and the auxiliary preamble sequence are appropriately designed so that the synthesized signal on the predefined resource is equal to the predefined preamble based reference signal. In this way, the predefined reference signal may be obtained at the receiving end by using the intrinsic interference of FBMC modulation, thereby making an efficient channel estimation.

13 Claims, 10 Drawing Sheets

(56) References Cited

U.S. PATENT DOCUMENTS

| 2015/0049836 A1 | 2/2015 | Li et al. |
| 2016/0099822 A1 | 4/2016 | Thein et al. |

FOREIGN PATENT DOCUMENTS

| CN | 103368889 A | 10/2013 |
| KR | 20140020176 A | 2/2014 |
| WO | 2011000109 A1 | 1/2011 |
| WO | 2014198346 A1 | 12/2014 |

OTHER PUBLICATIONS

Kofidis, E., "Short Preamble-Based Estimation of Highly Frequency Selective Channels in FBMC/OQAM", 2014 IEEE International Conference on Acoustics, Speech adn Signal Processing (ICASSP), Florence, Italy; May 4-9, 2014; 5 pages.

China National Intellectual Property Administration, First Office Action regarding Application No. 201510163486.5, dated Jan. 22, 2020, 13 pages.

* cited by examiner

METHOD AND APPARATUS FOR TRANSMITTING AND RECEIVING PREAMBLE BASED REFERENCE SIGNAL

CROSS-REFERENCE TO RELATED APPLICATIONS AND CLAIM OF PRIORITY

The present application claims priority under 35 U.S.C. § 365 to International Patent Application No. PCT/KR2016/003566 filed Apr. 6, 2016, entitled "METHOD AND APPARATUS FOR TRANSMITTING AND RECEIVING PREAMBLE BASED REFERENCE SIGNAL", and through Chinese Patent Application No. 201510163486.5, which was filed on Apr. 8, 2015, and Korean Patent Application No. 10-2016-0019013, which was filed on Feb. 18, 2016, each of which are incorporated herein by reference into the present disclosure as if fully set forth herein.

TECHNICAL FIELD

The present application relates to wireless communication, and particularly to methods and apparatuses for transmitting and receiving a preamble based reference signal based on a filter-bank multi-carrier modulation.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The rapid developments of information and communications industries, especially, the increasing demands from mobile internet and IoT (Internet of Things), bring unprecedented challenges to the mobile communications technologies. As reported in ITU-R M.[IMT.BEYOND 2020.TRAFFIC] from ITU, the mobile traffic is expected to grow by nearly 1000 times from year 2010 (in the era of 4G) to 2020, and the number of connecting devices will surpass 17 billion. As a massive amount of IoT equipments gradually penetrate into the mobile communication network, the number of the connecting devices will dramatically increase. In order to cope with these unprecedented challenges, the fifth-generation mobile communications technologies (5G) are being widely investigated and researched in the communication industries and in the academic community, facing the year of 2020. Currently, the framework and overall objectives of future 5G are being discussed in the report ITU-R M. [IMT.VISION], in which demand prospects, application scenarios and a variety of key performance indicators are described in detail. For new demands of 5G, the report of ITU-R M.[IMT.FUTURE TECHNOLOGY TRENDS] provides relevant information on developing trends and the like of 5G, intending to solve challenging problems, such as sharp increase of the system throughput, consistency of user experience, scalability to support IoT, ultra-low latency, high energy efficiency and high cost efficiency communications, highly flexible networks, support of new services, flexible spectrum usage and the like.

Modulation waveforms and multiple access schemes are fundamentals in designing Air-Interface of mobile communications, including 5G. Currently, Orthogonal Frequency Division Multiplexing (OFDM), which is a typical representative in the family of Multi-Carrier Modulation (MCM), is widely used in fields of audio and video broadcasting as well as in terrestrial communication systems, for example, Evolved Universal Terrestrial Radio Access (E-UTRA) protocols defined by the third Generation Partnership Project (3GPP) which corresponds to the system of Long Term Evolution (LTE), Digital Video Broadcasting (DVB) and Digital Audio Broadcasting (DAB), Very-high-bit-rate Digital Subscriber Loop (VDSL), IEEE802.11a/g Wireless Local Area Network (WLAN), IEEE802.22 Wireless Regional Area Network (WRAN) and IEEE802.16 World Interoperability for Microwave Access (WiMAX) and the like. It is well-known that the basic idea of OFDM is to divide a wideband channel into a plurality of parallel narrowband sub-channels/subcarriers so that high-rate data streams transmitted in frequency selective channels are transformed to low-rate data streams transmitted in a plurality of parallel independent flat-fading channels, thereby capabilities of the system to counter multipath interferences are greatly improved. Furthermore, OFDM can utilize Inverse Fast Fourier Transform/Fast Fourier Transform (IFFT/FFT) to achieve simplified modulation and demodulation modules. Moreover, the insertion of Cyclic Prefix (CP) transforms the involvement of the transmitted signal with channel from a linear convolution operation to a circular convolution operation. As a result, according to the properties of a circular convolution operation, when the length of CP is greater than the largest multipath channel delay spread, the signals can be received without Inter-symbol Interference (ISI) by applying simple one tap frequency-domain equalization, which in turn reduces processing and implementation complexities of receivers. Although modulation waveforms based on CP-OFDM are capable of meeting the service demands of mobile broadband (MBB) in the era of 4G, there are many limitations and shortcomings of applying CP-OFDM in 5G scenarios since 5G will have to face more challenging and diversified scenarios. The said limitations and shortcomings of applying CP-OFDM in 5G mainly include:

(1) The insertion of CP for resisting ISI will greatly reduce spectrum efficiency in 5G scenarios of low latency transmissions. To be specific, the low latency transmissions will greatly shorten the length of OFDM symbols while the length of CP is only constrained by the length of impulse response of channels, and thus the ratio of the length of CP to the length of OFDM symbols will increase greatly. Such overhead results in loss of spectrum efficiency to a great extent and thus is unacceptable in such scenarios requiring low latency transmissions.

(2) Strict requirements on time synchronization will result in large signaling overheads desired for maintaining the closed loop synchronization in IoT scenarios of 5G. In addition, the strict synchronization mechanism makes the design of data frame structure lack of flexibility and elasticity, and thus cannot satisfy the different synchronization requirements of a variety of services.

(3) OFDM adopts Rectangular Pulse which results in severe out-of-band leakage since this type of time domain waveform makes the side-lopes of its corresponding frequency domain counterpart roll off very slowly. Therefore, OFDM is very sensitive to the Carrier Frequency Offset (CFO). However, there will be many demands for flexible fragmented spectrums access/share in 5G, the high out-of-band leakage of OFDM greatly limits its flexibilities in designing fragmented spectrum access schemes or it needs large frequency-domain guard band, such factors reduce the spectrum efficiency accordingly.

These shortcomings are mainly due to OFDM characteristics. Although the impacts caused by these shortcomings can be reduced by adopting certain measures, it will increase the complexity of system designs, and these problems cannot be completely addressed.

Due to the problems mentioned above, as reported in ITU-R M[IMT.FUTURE TECHNOLOGY TRENDS], some new waveform modulation technologies (Multi-carrier Modulation based) are taken into account in 5G, of which Filter Bank Multi-Carrier (FBMC) modulation becomes one of the hot research topics. As FBMC provides degrees of freedom in designing Prototype Filter, it can employ the filters with good Time/Frequency Localization (TFL) property to pulse shape the transmission waveforms, such that the transmission signals can show various preferable characteristics, comprising improvement of the spectrum efficiency since the insertion of CP is not needed to resist the ISI, lower out-of-band leakage to support flexible access of fragmented spectrums and the insensitiveness to carrier frequency offset. The FBMC system generally employs Offset Quadrature Amplitude Modulation (OQAM) to maximize the spectrum efficiency. Therefore, such technology is generally named FBMC/OQAM system, or OFDM/OQAM system. The applications of FBMC in digital communications have been discussed in an early article entitled "Analysis and Design of OFDM/OQAM Systems Based on Filter Bank Theory" (IEEE Transactions on Signal Processing, vol. 50, no. 5, pp. 1170-1183, May 2002).

As FBMC has some advantageous characteristics which OFDM does not possess, FBMC attracts more and more attention in 5G research, but some of its inherent shortcomings challenge its applications in future mobile communication systems, and these challenges need to be solved and are being studied constantly. One of the most significant problems is that, in order to obtain the maximum spectrum efficiency, a system using FBMC must use a FBMC/OQAM or OFDM/OQAM modulation. In such a modulation, the carriers are only orthogonal in the real field instead of a pure orthogonal relationship, which means that the reference signal will be interfered by symbols from adjacent carrier. Such interference may not be eliminated effectively prior to equalization operation at the receiving end. The interference challenges the design of the reference signal, since that, without a special design, the reference signal will suffer from strong interference which may result in significant reduction of performance of channel estimation of the receiving end so that the signal may not be effectively equalized, and leading to high bit error rate.

In view of the above, in order to make the applications of FBMC system to have a preferable robustness, the reference signals for the applications must be designed appropriately, which is a key point as to whether FBMC system can be widely used in 5G.

SUMMARY

The present invention aims to design a preamble based reference signal for the filter-bank multi-carrier modulation technology, for example, OFDM/OQAM or Filtered Multi-tone. The preamble based reference signal is able to utilize the self-interference of OFDM/OQAM or FMT effectively so that the receiver may make an efficient channel estimation. Meanwhile, the design may also be compatible with some technologies that are widely used in OFDM systems, which make it well applied in a multi-user, multi-cell communication system.

In a first aspect, a method for transmitting a preamble based reference signal is provided. The method comprises: generating a main preamble sequence; generating an auxiliary preamble sequence, wherein, on a predefined resource, a synthesized signal of the main preamble sequence and the auxiliary preamble sequence is equal to a predefined preamble based reference signal; and transmitting the main preamble sequence and the auxiliary preamble sequence based on a filter-bank multi-carrier modulation.

In some embodiments, the synthesized signal on the predefined resource is synthesized by the main preamble sequence, an interference generated by the main preamble sequence, an interference generated by the auxiliary preamble sequence and an interference generated by a data signal, and wherein the predefined resource is a resource where the main preamble sequence is transmitted.

In some embodiments, the generating the auxiliary preamble sequence comprises: calculating the auxiliary preamble sequence, so that a sum of the main preamble sequence, the interference generated by the main preamble sequence, the interference generated by the auxiliary preamble sequence and the interference generated by the data signal is, on the predefined resource, equal to the predefined preamble based reference signal.

In some embodiments, the auxiliary preamble sequence is structurally symmetrical or asymmetrical to the main preamble sequence.

In some embodiments, the transmitting the auxiliary preamble sequence comprising: transmitting the auxiliary preamble sequence alone on an allocated resource; or transmitting the auxiliary preamble sequence superimposed with the data signal on the allocated resource.

In some embodiments, the interferences are interferences between different subcarriers based on the filter-bank multi-carrier modulation.

In some embodiments, the generating the main preamble sequence comprises: extracting a real part or an imagery part from the predefined preamble based reference signal to generate the main preamble sequence.

In some embodiments, the transmitting the main preamble sequence and the auxiliary preamble sequence comprises: transmitting the main preamble sequence and the auxiliary preamble sequence on a plurality of continuous subcarrier resources.

In some embodiments, the transmitting the main preamble sequence and the auxiliary preamble sequence comprises: transmitting the main preamble sequence and the auxiliary preamble sequence at different antenna ports, wherein the predefined preamble based reference signals used at the different antenna ports are orthogonal or quasi-orthogonal to each other.

In a second aspect, a method for receiving a preamble based reference signal is provided. The method comprises: receiving the preamble based reference signal on a predefined resource, wherein the preamble based reference signal is constructed by a main preamble sequence, an interference generated by the main preamble sequence, an interference generated by an auxiliary preamble sequence and an interference generated by a data signal, and wherein the predefined resource is a resource where the main preamble sequence is transmitted; and estimating a channel according to the received preamble based reference signal and a predefined preamble based reference signal.

In some embodiments, when the auxiliary preamble sequence is structurally symmetrical to the main preamble sequence, and the auxiliary preamble sequence and the data signal are superimposed on a same resource for transmission, the method further comprises: receiving signals on a resource where the auxiliary preamble sequence is transmitted, and combining the received signals to recover the data signal.

In a third aspect, a transmitter is provided. The transmitter comprises: a processor configured to generate a main preamble sequence and an auxiliary preamble sequence, wherein, on a predefined resource, a synthesized signal of the main preamble sequence and the auxiliary preamble sequence is equal to a predefined preamble based reference signal; and an antenna configured to transmit the main preamble sequence and the auxiliary preamble sequence based on a filter-bank multi-carrier modulation.

In a fourth aspect, a receiver is provided. The receiver comprises: an antenna configured to receive a preamble based reference signal on a predefined resource, wherein the preamble based reference signal is constructed by a main preamble sequence, an interference generated by the main preamble sequence, an interference generated by an auxiliary preamble sequence and an interference generated by a data signal, and wherein the predefined resource is a resource where the main preamble sequence is transmitted; and a processor configured to estimate a channel according to the received preamble based reference signal and a predefined preamble based reference signal.

The embodiments of the application design the main preamble sequence and the auxiliary preamble sequence appropriately so that the synthesized signal on the predefined resource is equal to the predefined preamble based reference signal. In this way, the predefined reference signal may be obtained at the receiving end by using the intrinsic interference of FBMC modulation, thereby making an efficient channel estimation. When embodiments of the application are applied thereto, the FBMC system may have better robustness and wide range of application.

BRIEF DESCRIPTION OF THE DRAWINGS

Further features, objects and advantages of the present application will be more apparent with a review of a detailed description of the non-limiting embodiments set forth below with reference to the attached drawings.

DETAILED DESCRIPTION

Hereinafter, the embodiments of the present application will be further explained in detail with reference to the accompanying drawings in order to make the purposes, technical solutions and advantages of the present application more clear. It should be understood that specific embodiments described herein are intended to explain the relevant invention, rather than to limit the invention. In addition, it should be noted that only these parts that are related to the present invention is shown in the accompanying drawings for ease of description.

It should be noted that the embodiments, and features in the embodiments of the present application may be combined unless they conflict against each other. Hereinafter, the present application will be explained in detail with reference to the accompanying drawings in connection with the embodiments.

A signal waveform having good time/frequency localization can be obtained by Filter Bank Multi-Carrier (FBMC) modulation, in which the corresponding prototype filter banks can be designed based on isotropic orthogonal transform algorithm (IOTA), extended Gaussian function (EGF) and European PHYDYAS and so on. That is, the FBMC system employs prototype filter banks with good TFL properties to pulse-shape the signals on each sub-carrier such that: 1) the FBMC can greatly suppress the ISI resulted from multipath fading channel without the insertion of CP, which not only results in higher spectrum efficiency and energy efficiency compared with OFDM, but also exhibits robust and reliable receiving performance under relatively large timing synchronization errors, which in turn allows asynchronous transmissions and receptions; and 2) with good Time/Frequency Localization property, the FBMC can transmit signals in extremely narrow frequency band and keep a very low out-of-band leakage which reduces the inter-carrier interference (ICI) resulted from Doppler spread and the phase noise. Therefore, the FBMC has great potential in cognitive radios, fragmented spectrum access and asynchronous transmission and the like.

In order to achieve the highest spectrum efficiency of the FBMC, the Offset Quadrature Amplitude Modulation (OQAM) is generally employed, which is referred to as FBMC/OQAM or OFDM/OQAM (OQAM is used hereafter in short). Other FBMC modulations of low rates comprise Filtered Multitone (FMT), Filtered OFDM and so on. Here, the OQAM is employed as a typical example to describe the transmission and reception of signals based on a filter-bank multi-carrier modulation. In the OQAM, one QAM symbol is divided into two signals, and these two signals are modulated onto the real or imaginary parts of a sub-carrier respectively, and they are transmitted alternately with a time offset. At a receiving end, if there is no effect of the channel, the transmitted signal can be recovered by extracting alternately the real or imaginary parts of the signal on each sub-carrier.

Figure 1:
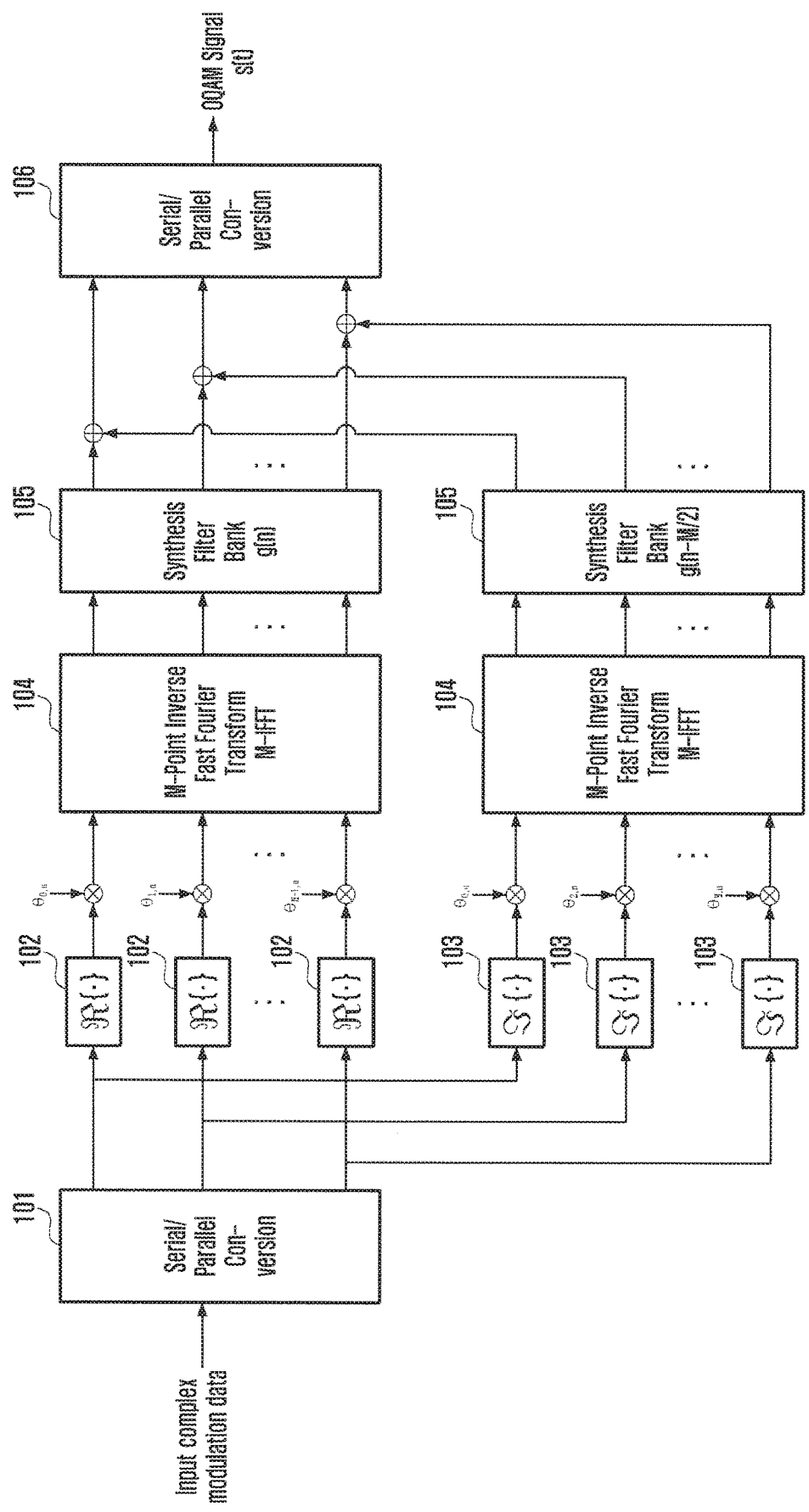
FIG. 1 illustrates a schematic diagram of generating conventional FBMC/OQAM signals.

FIG. 1 illustrates a schematic diagram of generating and transmitting conventional FBMC/OQAM signals.

As shown in FIG. 1, M parallel data are obtained after an inputted complex modulated data, such as a complex QAM (Quadrature Amplitude Modulation) symbol, is serial-to-parallel converted by a serial/parallel converter unit 101, where M is the number of the sub-carriers. Each signal is divided into two signals, and the real and imaginary parts of these two signals are extracted by a real part extracting unit 102 and an imaginary part extracting unit 103, respectively. Then, the real part and the imaginary part of the signals are modulated respectively via an inverse fast Fourier transform unit 104. The modulated signals are transmitted to a synthesis filter bank unit 105 to perform the pulse-shaping. At last, the real part and the imaginary part of the signals are combined, and the combined signals are inputted into a parallel/serial converter unit 106, which in turn outputs the OQAM signal.

The functions of each module or unit shown in FIG. 1 can be easily understood from the mathematical signal modeling of the OQAM signal. The equivalent form of the base band of the continuous-time multi-carrier FBMC/OQAM signal can be formulated as:

$$s(t) = \sum_{n \in Z} \sum_{m=0}^{M-1} a_{m,n} \underbrace{j_{m,n} e^{j2\pi m v_0 t} g(t - n\tau_0)}_{g_{m,n}(t)} \quad \text{[Math Figure 1]}$$

where $(E)_{m,n}$ represents a frequency-time point, $a_{m,n}$ represents a real modulated signal on the m-th sub-carrier of the n-th symbol, that is, a pulse amplitude modulation (PAM) symbol, $a_{m,n}$ is the value of the real or imaginary part of the complex QAM symbol $c_{m,\tilde{n}}$ with a symbol period of $\tau=2\tau_0$, such as, $$a_{m,n} = \begin{cases} \Re\{c_{m,\tilde{n}}\}, n \text{ is even number} \\ \Im\{c_{m,\tilde{n}}\}, n \text{ is odd number} \end{cases}$$

$\Re\{\cdot\}$ and $q\{E\}$ represent extracting real part and extracting imaginary part, respectively; j is a imaginary symbol; $j_{m,n}$ represents the real-imaginary alternation; $j_{m,n=1}$ when m+n is an even number, otherwise $j_{m,n=j}$, which is represented by $\theta_{m,n}$ in FIG. 1; M is an even number representing the number of sub-carriers; Z is a set of the transmitted symbols; $v_O$ is the subcarrier spacing; $\tau_O$ is the symbol period of the OQAM symbol, and $\tau_0=\tau2=1/(2v_0)$; g b is a prototype filter function, whose time-domain impulse response length is generally K times of $\tau$, which results in an overlapping of the time-domain waveforms of the adjacent (2K−1) symbols, and thus K is generally referred to as an overlapping factor of the filter. $g_{m,n(t)}$ is an effective synthesis filter function for modulating $a_{m,n}$. It can be seen that the symbol rate of the OQAM is two times of the symbol rate of the traditional OFDM without cyclic prefix (CP). Because the OQAM modulation is based on real numbers, the information amount of each OQAM symbol is half of that of the traditional OFDM. That is to say, the signal rate of an OQAM system is the same as that of an OFDM system without CP.

Figure 2:
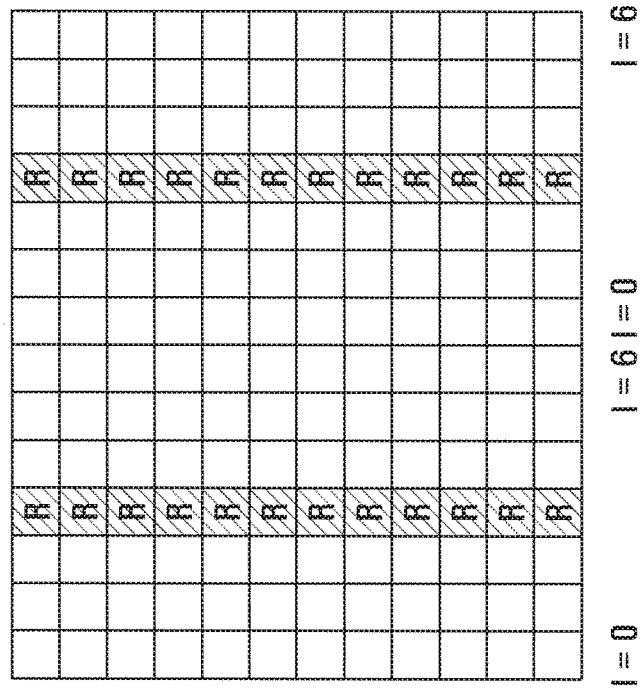
FIG. 2 illustrates a diagram of two types of reference signal structure.
Figure 2:
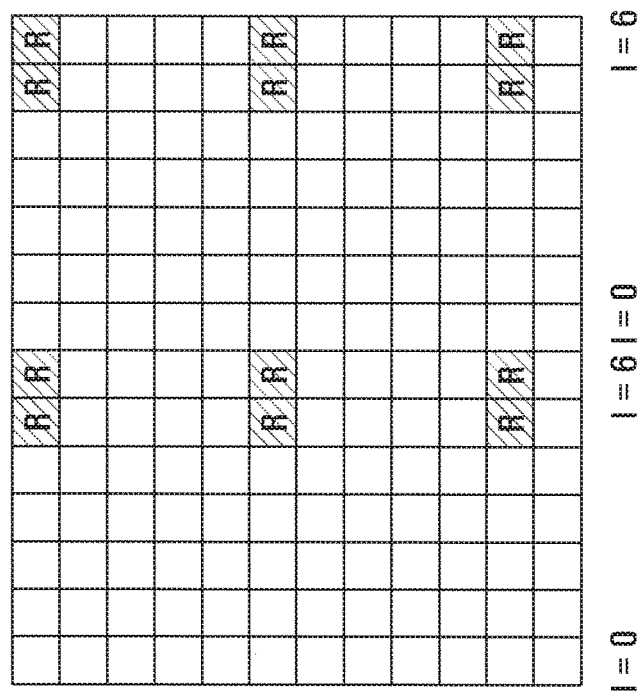
Figure 3:
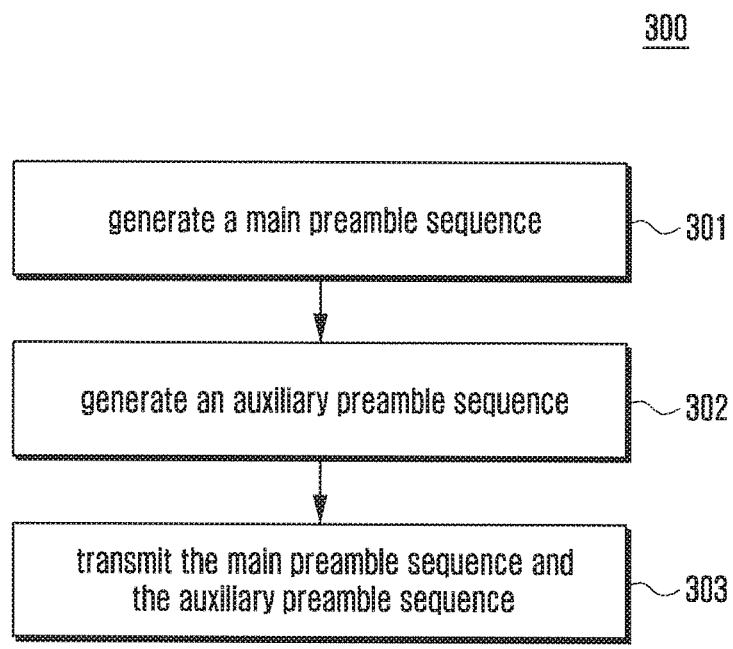
FIG. 3 illustrates an exemplary flow chart of a method for transmitting a reference signal in accordance with an embodiment of the present application.

The real field orthogonality of the OQAM is achieved by designing prototype filter function g. The inner product of the synthesis filter function at the transmitting end and the analysis filter function at the receiving end needs to meet or approximately meet equation (2), that is, the prototype filter needs to meet:

$$\Re\{\underbrace{\langle g_{m,n} | g_{m',n'} \rangle}_{\langle g \rangle_{m,n}^{m',n'}}\} = \Re\left(\int g_{m,n}(t) \cdot g^*_{m',n'}(t) dt\right) = \delta_{m,m'} \delta_{n,n'} \quad \text{[Math Figure 2]}$$

where * represents complex conjugating, $\Re\{\cdot\}$ represents an operation of extracting real part, <EcE> represents inner product, if (m=m') and (n=n'), $\delta_{m,m'=1}$, $\delta_{n,n'=1}$, otherwise the value is 0. That is to say, if m≠m' or n≠n', the inner product is pure imaginary term. In order to facilitate the description, $\langle g \rangle_{m,n}^{m',n'}$ is used to represent the inner product. It is obvious that the interference generated by the signals between the different sub-carriers and the different symbols is pure imaginary part interference. Accordingly, when the signal s(t) modulated by the FBMC/OQAM goes through a distortion-free channel, the perfect reconstruction (PR) of the original transmitted real signal $a_{m,n}$ can be achieved by simply processing the received signal according to equation (3) via the receiving analysis filter (AF) $g^*_{m,n(t)}$ which corresponds to the transmitting synthesis filter (SF), $g_{m,n(t)}$, where $\eta_o$ is noisy term, then the original data can be modulated by synthesizing the complex QAM signal $c_{m,\tilde{n}}$.

$$\hat{a}_{m,n} = \Re\{y_{m,n}\} = \Re\{\langle (s(t)+n(t)) | g_{m,n} \rangle\} = a_{m,n} + \eta_0,$$
$$m = 0, \ldots M-1, n \in Z \quad \text{[Math FIG. 3]}$$

The assumption of the aforementioned distortion-free channel does not exist in an actual wireless communication system. Signals have to pass through a wireless communication channel with the multipath effect and the Doppler frequency shift effect before they reach a receiving end. Therefore, channel equalization is needed at the receiving end to recover the transmitted signals. A prerequisite for enabling the channel equalization at the receiving end is that sufficient channel information has been obtained at the receiving end. In an actual system, this process is generally achieved through a predefined reference signal: a predefined reference signal known to a receiving end is transmitted at the transmitting end, and channel response information is estimated at the receiving end based on the value of the predefined reference signal after receiving the predefined reference signal. The structures of the reference signal may be catalogued into a discrete reference signal (Scattered Pilot) structure and a continuous preamble based reference signal (Preamble) structure. A system may select a preferred reference signal structure based on different purposes. For example, in a LTE system, the downlink adopts the scattered pilot based reference signal structure, while an uplink adopts the preamble based reference signal structure due to a different modulation scheme is utilized.

FIG. 2 illustrates two types of reference signal structure.

As shown in FIG. 2, the left drawing illustrates a structure of a scattered pilot based reference signal with the reference signal distributed on scattered subcarriers; the right drawing illustrates a structure of a preamble based reference signal with the reference signal distributed on continuous subcarriers.

The preamble based reference signal referred to in the embodiments of the present application is a preamble sequence constituted on a plurality of continuous subcarriers, which is similar to those used in a LTE uplink, unless otherwise stated.

FIG. 3 illustrates an exemplary flow 300 of a method for transmitting a reference signal in accordance with an embodiment of the present application As shown in FIG. 3, in step 301, a main preamble sequence is generated.

Then, in step 302, an auxiliary preamble sequence is generated. A synthesized signal of the main preamble sequence and the auxiliary preamble sequence on a predefined resource is equal to a predefined preamble based reference signal.

Finally, in step 303, the main preamble sequence and the auxiliary preamble sequence are transmitted based on a filter-bank multi-carrier modulation.

In some embodiments, the synthesized signal on the predefined resource is synthesized by the main preamble sequence, an interference generated by the main preamble sequence, an interference generated by the auxiliary preamble sequence and an interference generated by a data signal, and the predefined resource is a resource where the main preamble sequence is transmitted.

The main preamble sequence and the auxiliary preamble sequence are designed appropriately so that the synthesized signal on the predefined resource is the same as the predefined preamble based reference signal. In this way, the predefined reference signal may be obtained at the receiving end by using the intrinsic interference of the FBMC modulation (for example, OQAM), and thus makes an efficient channel estimation. When an embodiment of the present application is applied, the FBMC system may have better robustness and wide range of application.

Various structures of the auxiliary preamble sequence may be designed. The methods for transmitting and receiving a reference signal in accordance with embodiments of the present application will be described in connection with particular embodiments.

Embodiment 1

In the embodiment, a particular design of a reference signal structure is provided, and the design method may also be applied to other reference signal structures.

Figure 4:
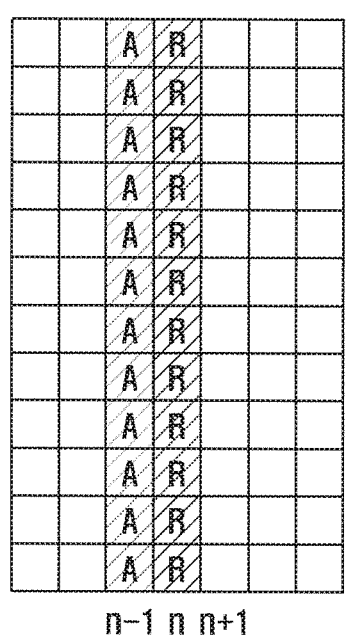
FIG. 4 illustrates a schematic diagram of the structure of a main preamble sequence and an auxiliary preamble sequence in accordance with Embodiment 1 of the present application.

FIG. 4 illustrates an exemplary structure of a reference signal in accordance with the Embodiment 1 of the present application. In FIG. 4, a schematic diagram illustrating a main preamble sequence, an auxiliary preamble sequence and a data signal multiplexed in a data block. As can be seen from FIG. 4, the auxiliary preamble sequence is structurally asymmetric to the main preamble sequence.

In various embodiments of the present application, a conventional ZC (Zadoff-Chu) sequence is used as a predefined preamble based reference signal, i.e., a target reference signal or a target preamble sequence. The ZC sequence has a variety of unique characteristics, for example, good autocorrelation and cross-correlation characteristics, low PAPR (Peak to Average Power Ratio), etc. These features enable the ZC sequence to be widely used in the design of reference signals in wireless communication systems, such as a demodulation reference signal in LTE. A generation method of the ZC sequence may be expressed by the following Equation (4):

$$a_q(m) = \exp\left[-j2\pi q \frac{m(m+1)/2 + l}{N_{ZC}}\right],$$ [Math Figure 4]

$$m = 0, 1, \ldots, N_{ZC} - 1$$

where $qH\{1, \ldots, N_{ZC}-1\}$ is a root index, $l_n$ is any integer. In the present embodiment, the root index is omitted, and a(m) is defined as a target preamble sequence and l=0 is set. It should be noted that the ZC sequence is used herein only as an example, other complex reference signals may also be used in the present invention.

Figure 5:
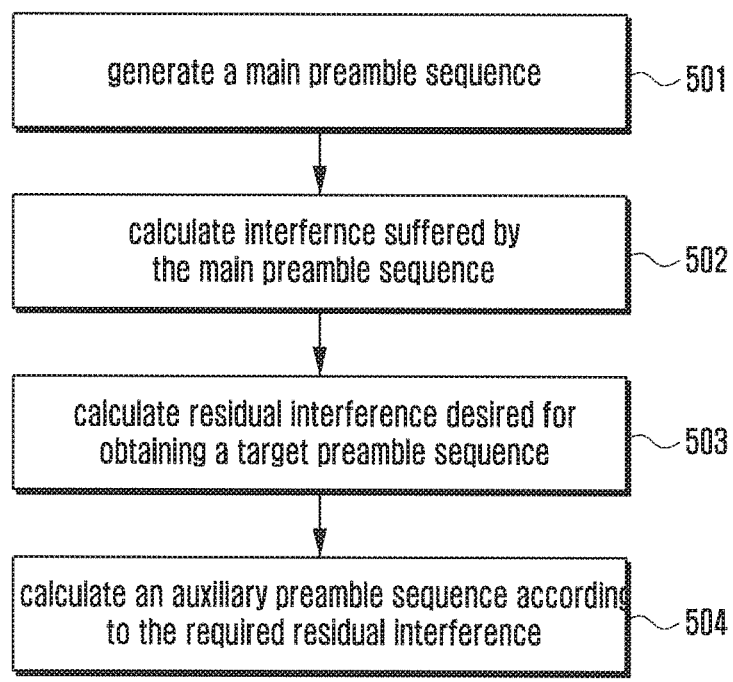
FIG. 5 illustrates a schematic flow chart of a method for generating a main preamble sequence and an auxiliary preamble sequence in accordance with an embodiment of the present application.

FIG. 5 illustrates a schematic flow chart of a method for generating a main preamble sequence and an auxiliary preamble sequence in accordance with Embodiment 1 of the present application. The method for generating the preamble sequence structure shown in FIG. 4 will now be described with reference to FIG. 5.

Step 501: a main preamble sequence is generated.

Unlike traditional OFDM modulation, symbols of OQAM modulation may only be real PAM signals and be alternately modulated onto a real constellation point or an imaginary constellation point. Therefore, real or imaginary parts are extracted from a predefined reference signal to generate the main preamble sequence in one implementation. For example, the generation of the main preamble sequence in PAM form may be achieved through extracting the real or imaginary parts of a ZC sequence.

$$R(m) = \begin{cases} \Re\{a(m)\} & m \text{ is an even number} \\ \Im\{a(m)\} & m \text{ is an odd number} \end{cases}$$ [Math Figure 5]

After imaginary-real-alternate modulation $(R(m)j_{m,n})$, the modulated signal transmitted by the main preamble sequence is:

$\{R(0), R(1)j, R(2), \ldots, R(N_{ZC}-1)j\}$

Step 502: interference suffered by the main preamble sequence is calculated.

Figure 6:
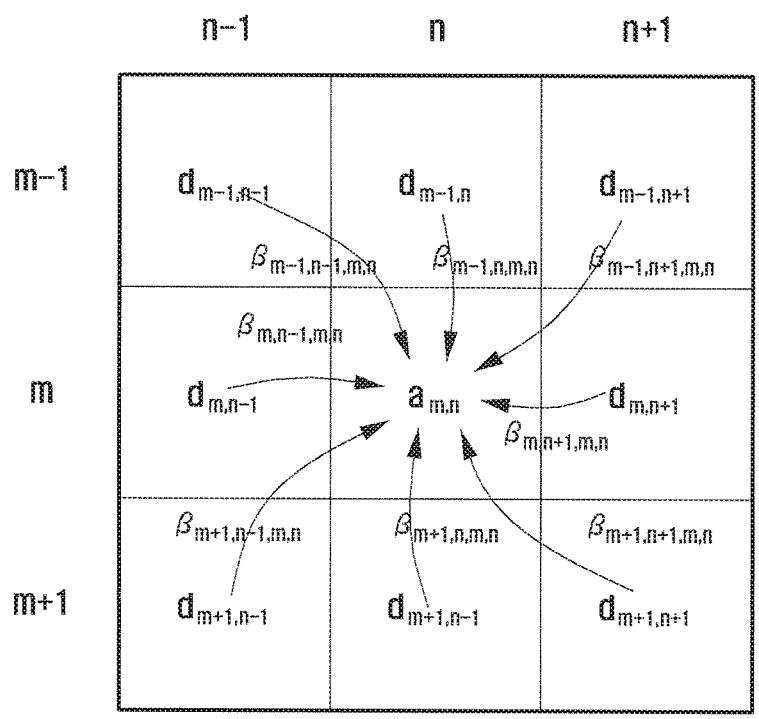
FIG. 6 illustrates a schematic diagram of interferences between subcarriers in OQAM modulation.

As previously described, OQAM modulation only has real field orthogonality. The transmitted imaginary-real-alternate signals will also be subject to real-imaginary-alternate interferences at the receiving end, even in a distortion-free channel. These interferences come from signals on an adjacent carrier. For example, assuming one of the real signals modulated on the (m,n)th subcarrier at the transmitting end is $a_{m,n}$, $x_{m,n}=a_{m,n}+b_{m,n}j$ will be received on the (m,n)th subcarrier at the receiving end (assuming the channel is lossless), where:

$$b_{m,n} = \sum_{m',n' \in D} \beta_{m',n',m,n} d_{m',n'}$$ [Math Figure 6]

where m',n' are indexes for subcarriers adjacent to the (m,n)th subcarrier; $d_{m',n'}$ is a symbol on the (m',n')th subcarrier; $\beta_{m',n',m,n}$ is an interference factor of the (m',n')th carrier to the (m,n)th carrier in the OQAM modulation. The interference factor is determined by parameters of the applied prototype filter, and may be obtained by calculation or simulation. D is a set of indices of all carriers that may cause interference to the (m,n)th carrier.

FIG. 6 illustrates a diagram of the interferences between subcarriers in the OQAM modulation, i.e., a schematic diagram of the above-mentioned interference condition. As shown in FIG. 6, the set D has a total of 8 adjacent carriers causing interference to $a_{m,n}$.

In the case based on the structure of the preamble based reference signal in FIG. 4, the self-interference suffered by the main preamble sequence and the interference due to a data signal are calculated in step 502. It should be noted that, at this point, the interference caused by the auxiliary preamble sequence is not calculated, and is assumed to be zero. Assuming the main preamble sequence is the n-th OQAM symbol in a data block, when m is an even number:

$$R_{m,n} = R(m) + \left[ \sum_{m',n' \in D} \beta_{m',n',m,n} d_{m',n'} + \beta_{m+1,n,m,n} R(m+1) + \beta_{m-1,n,m,n} R(m-1) \right] j$$

Figure 7:
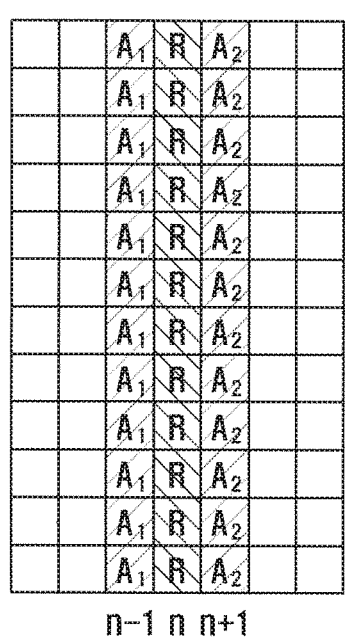
FIG. 7 illustrates a schematic diagram of the structure of a main preamble sequence and an auxiliary preamble sequence in accordance with Embodiment 2 of the present application.

[Math Figure 7]

or when m is an odd number:

$$R_{m,n} = R(m)j + \left[ \sum_{m',n' \in D} \beta_{m',n',m,n} d_{m',n'} + \beta_{m+1,n,m,n} R(m+1) + \beta_{m-1,n,m,n} R(m-1) \right]$$

Figure 8:
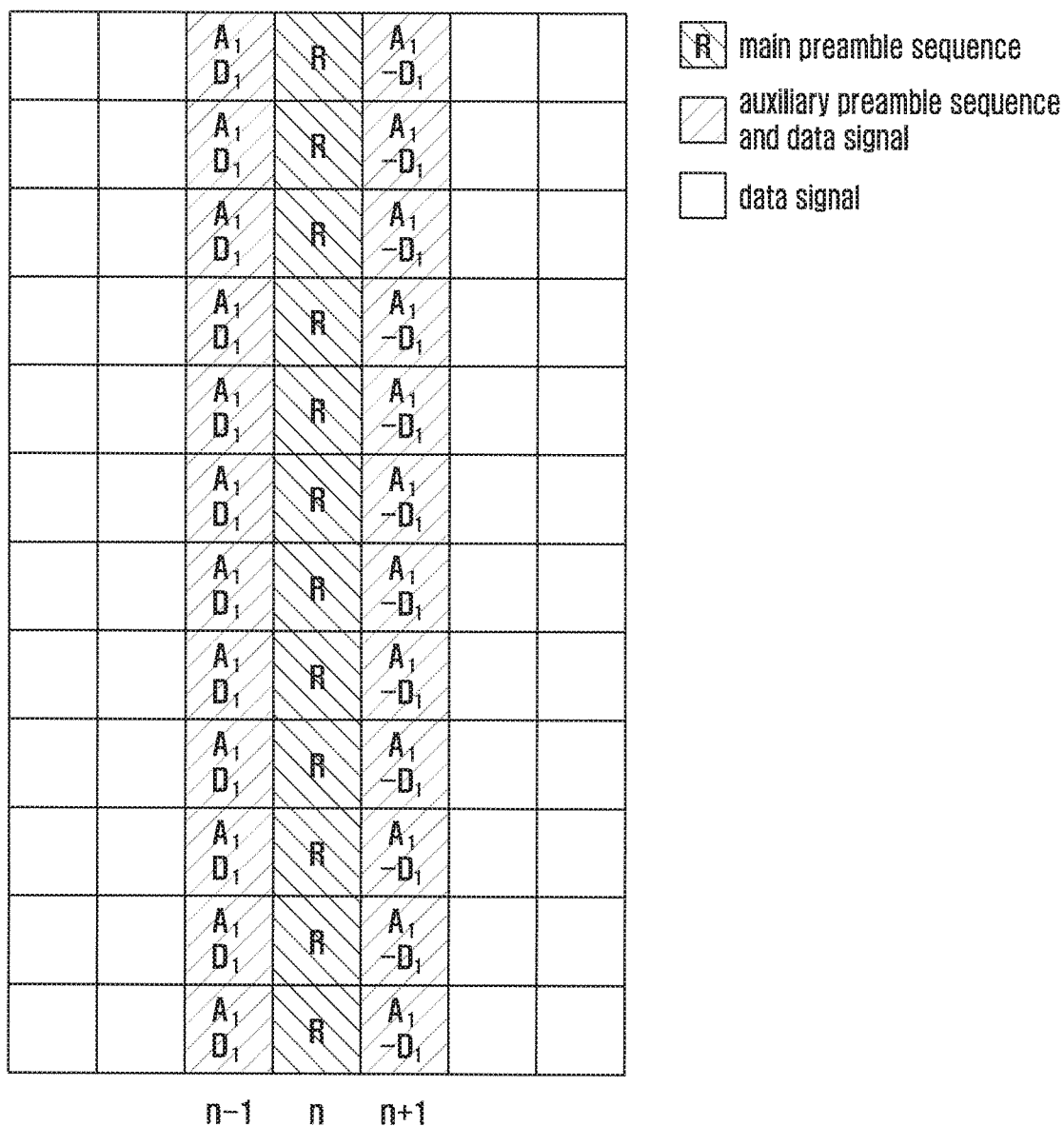
FIG. 8 illustrates a schematic diagram of the structure of a main preamble sequence and an auxiliary preamble sequence in accordance with Embodiment 3 of the present application.

[Math Figure 8]

Where $R_{m,n}$ is an equivalent complex signal synthesized on the (m,n)th subcarrier and includes the originally modulated main preamble sequence and the interference suffered. $d_{m',n'}$ is the data signal on an adjacent carrier;

$$\sum_{m',n' \in D} \beta_{m',n',m,n} d_{m',n'}$$

is the interference caused by the data signal; and $\beta_{m+1,n,m,n} R(m+1) + \beta_{m-1,n,m,n} R(m-1)$ is a self-interference signal generated by the main preamble sequence.

Further referring to FIG. 5, step 503: the residual interference desired for obtaining a complex ZC sequence is calculated.

In Equation (5) of step 501, the originally modulated main preamble sequence on each subcarrier includes only real numbers or imaginary numbers $\{R(0),R(1)j,R(2), \ldots, R(N_{ZC}-1)j\}$. The modulated signal on each subcarrier becomes a complex signal $R^{m,n}$ due to inter-carrier interference. Accordingly, the desired target ZC sequence may be reconstructed on the carrier resource of the main preamble sequence by constructing interference on the subcarriers where the main preamble sequence is located. Since part of the interference already exists, only the desired residual interference needs to be calculated:

$$I_{m,n} = a(m) - R_{m,n}$$

Figure 9:
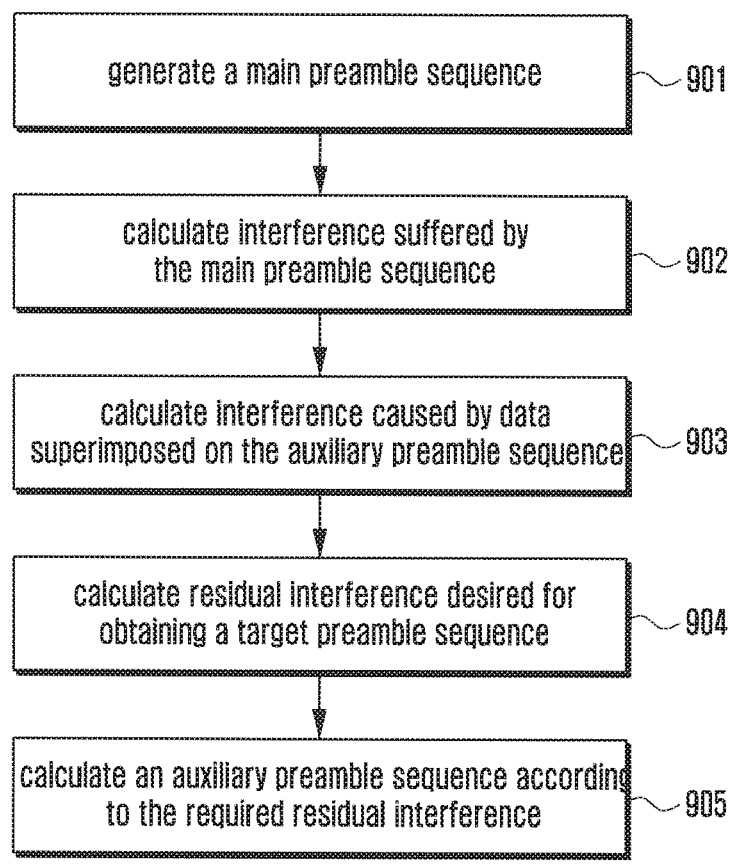
FIG. 9 illustrates a schematic flow chart of a method for calculating an auxiliary preamble sequence using a data loading mode in accordance with Embodiment 3 of the present application.

[Math FIG. 9]

where $I_{m,n}$ represents the desired residual interference, and the following may be obtained based on Equations (5), (7) and (8):

$$I_{m,n} = \Im\{a(m)\}j - \left[ \sum_{m',n' \in D} \beta_{m',n',m,n} d_{m',n'} + \beta_{m+1,n,m,n} R(m+1) + \beta_{m-1,n,m,n} R(m-1) \right] j$$

Figure 10:
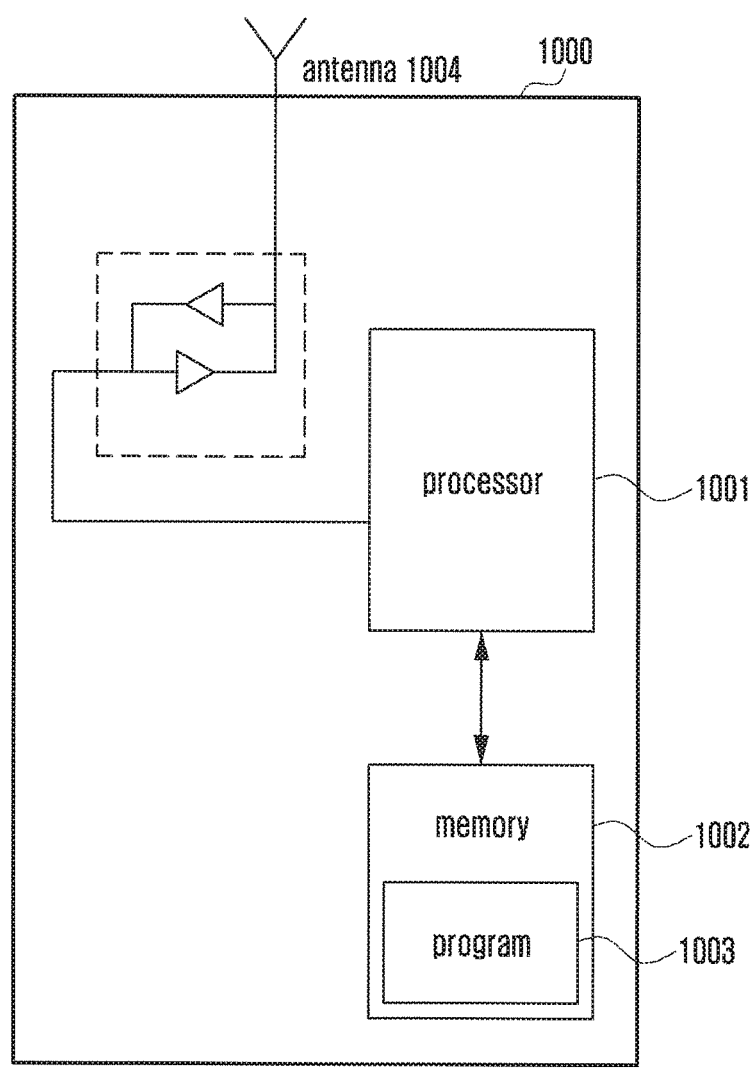
FIG. 10 illustrates a simplified block diagram of an entity which is suitable for implementing the exemplary embodiments of the present application.

[Math Figure 10]

if m is an even number;

$$I_{m,n} = \Re\{a(m)\} - \left[ \sum_{m',n' \in D} \beta_{m',n',m,n} d_{m',n'} + \beta_{m+1,n,m,n} R(m+1) + \beta_{m-1,n,m,n} R(m-1) \right]$$

if m is an odd number.

Step 504: an auxiliary preamble sequence is calculated.

The desired residual interference $I_{m,n}$ may be calculated based on Equation (10). In Embodiment 1, $I_{m,n}$ is generated through an auxiliary preamble sequence as shown in FIG. 4. $A = [A(0), A(1), \ldots, A(N_{ZC}-1)]^T$ is an auxiliary preamble sequence vector, and interference thereof generated on the main preamble sequence may be expressed as:

[Math Figure 11]

$$\begin{bmatrix} e(0) \\ e(1) \\ \vdots \\ e(N_{ZC}) \end{bmatrix} = \begin{bmatrix} \beta_{0,n-1,0,n} & \beta_{1,n-1,0,n} & 0 & \cdots & 0 \\ \beta_{0,n-1,1,n} & \beta_{1,n-1,1,n} & \beta_{2,n-1,1,n} & \cdots & 0 \\ \vdots & \vdots & \vdots & \ddots & \vdots \\ 0 & 0 & 0 & \cdots & \beta_{N_{ZC}-1,n-1,N_{ZC}-1,n} \end{bmatrix} \begin{bmatrix} A(0) \\ A(1) \\ \vdots \\ A(N_{ZC}-1) \end{bmatrix}$$

where $[e(0), e(1), \ldots, e(N_{ZC}-1)]^T$ represents interference caused by the auxiliary preamble sequence on the main preamble sequence carrier. Therefore, $e(m) = \Im(I_{m,n})$ is set if m is an even number; and $e(m) = \Re(I_{m,n})$. If m is an odd number, and the following may be calculated:

[Math Figure 12]

$$\begin{bmatrix} A(0) \\ A(1) \\ \vdots \\ A(N_{ZC}-1) \end{bmatrix} = [\gamma]^{-1} \begin{bmatrix} e(0) \\ e(1) \\ \vdots \\ e(N_{ZC}) \end{bmatrix}$$

-continued where:

$$[\gamma] = \begin{bmatrix} \beta_{0,n-1,0,n} & \beta_{1,n-1,0,n} & 0 & \cdots & 0 \\ \beta_{0,n-1,1,n} & \beta_{1,n-1,1,n} & \beta_{2,n-1,1,n} & \cdots & 0 \\ \vdots & \vdots & \vdots & \ddots & \vdots \\ 0 & 0 & 0 & \cdots & \beta_{N_{ZC}-1,n-1,N_{ZC}-1,n} \end{bmatrix}$$

It can be seen that the synthesized complex sequence generated on the subcarrier where the main preamble sequence is located is equal to a(m), when the values of the auxiliary preamble sequence satisfies Equation (12). According to the OQAM demodulation (without the real and imaginary parts being extracted), a ZC sequence influenced by the channel may be obtained at the receiving end, on the resource where the main preamble sequence is transmitted. In other words, the channel may be estimated at the receiving end according to a predefined ZC sequence, for example, $H_{m,n} = Y_{m,n}/a(m)$, where $Y_{m,n}$ is a complex OQAM signal received on the (m,n)th carrier.

In the above description, the method of generating a complex ZC sequence is provided through four steps as shown in FIG. 5. Although the values of the main preamble sequence and the auxiliary preamble sequence are still taken based on the real PAM, a complex ZC sequence may be obtained at the receiving end as the reference signal utilizes the intrinsic interference of the OQAM modulation. Thus, the design method is not conditioned by the real-imaginary-alternate modulation of OQAM, and may be applied to designs of any traditional reference signal. For example, in LTE system, some principles for designing the reference signal, such as using ZC sequence with cyclic extension, utilizing diffident root indices for diffident cells, using cyclic shift to produce a plurality of orthogonal sequences or the like may be perfectly transplanted to the OQAM system.

Embodiment 2

In the present embodiment, a different structure of an auxiliary preamble sequence is provided, wherein the auxiliary preamble sequence is structurally symmetrical to the main preamble sequence.

sequence in accordance with Embodiment 2 of the present application. As shown in FIG. 7, the auxiliary preamble sequence is structurally symmetrical to the main preamble sequence. The auxiliary preamble sequences are arranged on both sides of the main preamble sequence in this structure.

In some implementations, two groups of auxiliary preamble sequences may have the same value, $A_{1,m} = A_{2,m}$, and produce the desired interference together. Based on the structure of FIG. 7, a pair of symmetrical preamble sequences generates non-zero interference at the subcarrier therebetween, and the interference at other subcarriers on the main preamble sequence's resource is zero. That is, for the auxiliary preamble symbol pair $A_{1,m}$, $A_{2,m}$, if the interference on $R_j$ (j=0, 1, . . . , M) caused by them is defined as $e_{j,n}$, then $$e_{j,n} = \begin{cases} A_{1,m}\beta_{m,n-1,m,n} + A_{2,m}\beta_{m,n+1,m,n} & \text{if } j = m \\ 0 & \text{if } j \neq m \end{cases} \quad \text{[Math Figure 13]}$$

$\beta_{m,n-1,m,n} = \beta_{m,n+1,m,n}$ is obtained due to the symmetry of the prototype filter function. Further, $A_{1,m} = A_{2,m}$ and thus $e_{m,n} = 2A_{1,m}\beta_{m,n-1,m,n}$. Therefore, based on the preamble sequence structure of FIG. 7, the calculation of the auxiliary preamble sequence may also be carried out by the method described in Embodiment 1. Specifically, first, the desired interference $I_{m,n}$ is calculated by step 501 to step 503 as shown in FIG. 5 in accordance with Embodiment 1. Secondly, $e(m) = \Im(I_{m,n})$ is set if m is an even number; and $e(m) = \Re(I_{m,n})$ is set if m is an odd number, and then the following may be calculated:

[Math Figure 14]

$$\begin{bmatrix} A(0) \\ A(1) \\ \vdots \\ A(N_{ZC}-1) \end{bmatrix} = \begin{bmatrix} \frac{1}{2\beta_{0,n-1,0,n}} & 0 & \cdots & 0 \\ 0 & \frac{1}{2\beta_{1,n-1,1,n}} & \cdots & 0 \\ \vdots & \vdots & \ddots & \vdots \\ 0 & 0 & 0 & \frac{1}{2\beta_{N_{ZC}-1,n-1,N_{ZC}-1,n}} \end{bmatrix} \begin{bmatrix} e(0) \\ e(1) \\ \vdots \\ e(N_{ZC}) \end{bmatrix}$$

In Embodiment 1, the calculation of the auxiliary preamble sequence needs a matrix operation (Equation (12)). The inverse operation of a matrix may be operated offline. However, the operation of matrix multiplication still has a certain degree of complexity. In the present embodiment, a new preamble sequence structure is provided to reduce the complexity.

FIG. 7 schematically illustrates a diagram of the structure of the main preamble sequence and the auxiliary preamble It can be seen from Equation (14) that the value of the auxiliary preamble sequence on each subcarrier may be obtained through a simple division operation according to the desired interference on the carrier. Compared to Equation (12) in Embodiment 1, the complexity of Equation (14) is significantly reduced. Thus, the method of the symmetrical auxiliary preamble sequence in the present embodiment may be implemented quickly.

Embodiment 3

In the present embodiment, a structure of the auxiliary preamble sequence identical to that of Embodiment 2 is provided, except that the auxiliary preamble sequence is transmitted together with the data signal on the same resource.

In Embodiment 2, the symmetrical structure of the auxiliary preamble sequence may allow to generate simple auxiliary preamble sequence. However, compared to the structure in FIG. 4 in Embodiment 1, the structure as shown in FIG. 7 includes two columns of the auxiliary preamble sequences. In other words, the symmetrical preamble sequence structure requires more subcarrier resources to be used to generate the main preamble sequence. It is obvious that the consumption of more subcarrier resources means lower spectrum efficiency. In this embodiment, an improved method is provided which may reduce the consumption of resources caused by the auxiliary preamble sequence through a data loading method, thereby improving the spectrum utilization efficiency.

FIG. 8 schematically shows a schematic structure diagram of the main preamble sequence and the auxiliary preamble sequence in accordance with Embodiment 3 of the present application. In the above symmetrical auxiliary preamble sequence structure, two columns of the auxiliary preamble sequences have the same value: $A_{1,m}=A_{2,m}$. Therefore, it may be considered that the two columns of the auxiliary preamble sequences use a cover code of a [++] type. Thus, one column of data signals may be superimposed on the auxiliary preamble sequences using an orthogonal cover code. For example, if $D_{1,m}$, $D_{2,m}$ are defined as data signals that are superimposed and transmitted on the auxiliary preamble sequence, the data signals may use a cover code of a [+−] type, i.e., $D_{1,m}=-D_{2,m}=D_m$. At the receiving end, the receiver may recover the data signals by only combining the signals on the resource where the auxiliary preamble sequence is transmitted:

$$\tilde{D}_m = Y_{1,m} - Y_{2,m}$$ [Math FIG. 15]

Where $\tilde{D}_m$ represents the received signal on carrier m after combination; $Y_{1,m}$, $Y_{2,m}$ represent received signals on the resource where the two columns of auxiliary preamble sequences are transmitted.

However, due to the interference of the superimposed data signals to the main preamble sequence, the method of calculating the auxiliary preamble sequence in this embodiment is slightly different from that when no data is loaded. Specifically, when the interference suffered by the main preamble sequence due to data signals is calculated in step 502 in FIG. 5, the superimposed data signals should also be taken into account, and then the value of the auxiliary preamble sequence is calculated. The flow chart of the method is illustrated in FIG. 9.

FIG. 9 illustrates an exemplary flow chart of the method of calculating the auxiliary preamble sequence by the way of data loading in accordance with Embodiment 3 of the present application.

Step 901: a main preamble sequence is generated.

The generation of the main preamble sequence is the same as that of step 501 as shown in FIG. 5. For example, first, a target complex preamble sequence is generated, and then the real or imaginary part of the target complex preamble sequence is extracted as the main preamble sequence.

Step 902: interference suffered by the main preamble sequence is calculated.

This step is the same as step 502 as shown in FIG. 5, i.e., calculating interference suffered by the main preamble sequence comprises calculating self-interference of the main preamble sequence and interference caused by a data signal.

Step 903: interference caused by the data superimposed on the auxiliary preamble sequence is calculated.

The interference generated by the superimposed data signals may be calculated according to the relevant description of step 502 of FIG. 5, and the redundant description thereof is omitted here.

Step 904: residual interference desired for obtaining the target complex preamble sequence is calculated.

Step 905: the auxiliary preamble sequence is calculated according to the desired residual interference.

Steps 904, 905 are the same as steps 503, 504, and will not be repeated herein.

The foregoing describes the methods for generating and transmitting the preamble based reference signal provided in the present application through three preferred embodiments. It should be understood that various modifications to the embodiments in the present application are possible. For example, the auxiliary preamble sequence in Embodiment 1 may also be superimposed with the data signal so as to reduce resource consumption due to the auxiliary preamble sequence and improve the spectrum utilization efficiency.

In some embodiments, both of the main preamble sequence and the auxiliary preamble sequence may be transmitted at diffident antenna ports, and the predefined reference signal sequences used on the different antenna ports are orthogonal or quasi-orthogonal to each other. For example, a main preamble sequence 1 and an auxiliary preamble sequence 1 are transmitted on a first antenna port, and the synthesized signal thereof is a reference signal sequence 1 used by the first antenna port; a main preamble sequence 2 and an auxiliary preamble sequence 2 are transmitted on a second antenna port, and the synthesized signal thereof is a reference signal sequence 2 used by the second antenna port; and the reference signal sequence 1 and the reference signal sequence 2 may be orthogonal or quasi-orthogonal to each other.

In another aspect, a method for receiving a preamble based reference signal is also provided in the embodiments of the present application. The intrinsic interference of OQAM modulation is taken into account in the design of the preamble based reference signal in accordance with the present application. Therefore, the predefined preamble based reference signal may be obtained at the receiving end utilizing the intrinsic interference of OQAM modulation directly without any interference elimination so as to perform the effective channel estimation.

In some embodiments, the method for receiving a preamble based reference signal comprises receiving a preamble based reference signal on a predefined resource. In the design method of the preamble sequence in accordance with the embodiments of the present application, the preamble based reference signal is constructed by a main preamble sequence, an interference generated by the main preamble sequence, an interference generated by an auxiliary preamble sequence and an interference generated by a data signal, and the predefined resource is a resource on which the main preamble sequence is transmitted. Subsequently, a channel estimation may be performed at the receiving end according to the received preamble based reference signal and the predefined preamble based reference signal.

Alternatively or additionally, in some embodiments, when the auxiliary preamble sequence is structurally symmetrical to the main preamble sequence, and the auxiliary preamble sequence and the data signal are superimposed on a same resource for transmission, the method may further comprises receiving signal on a resource where the auxiliary preamble sequence is transmitted and combining the received signals to recover the data signal.

FIG. 10 illustrates a simplified block diagram of an entity 1000 which is suitable for implementing the exemplary embodiments of the present application. The entity 1000 may be configured as a transmitting device, such as a transmitter. The entity 1000 may also be configured as a receiving device, such as a receiver. The entity 1000 may also be configured to have both transmitting and receiving functions, such as a transceiver.

As shown in FIG. 10, the entity 1000 comprises a processor 1001, a memory 1002 coupled to a processor 1001 and a suitable radio frequency (RF) antenna 1004 coupled to the processor 1001. The memory 1002 stores a program 1003. The antenna 1004 is suitable for two-way wireless communications. It should be noted that only one antenna 1004 is shown in FIG. 10, and a plurality of antennas are possible in practice. The entity 1000 may be coupled to one or more exterior networks or systems, such as Internet, via data paths.

The program 1003 may include program instructions. When executed by the associated processor 1001, these program instructions may enable the entity 1000 to operate in accordance with the exemplary embodiments of the present application.

The embodiments of the present application may be implemented by computer software that may be executed by the processor 1001 of the entity 1000, or by hardware, or a combination thereof.

The memory 1002 may be any suitable type of memory that fits the local technical environment, and may be implemented using any suitable data storage technology, such as memory devices and systems based on semiconductor, magnetic memory devices and systems, optical memory devices and systems, fixed memory and removable memory which are non-limiting examples only. Although only one memory is shown in the entity 1000, a plurality of physically separate storage units may be present in the entity 1000. The processor 1001 may be any suitable type of processor that fits the local technical environment, and may comprise one or more of: general purpose computer, special purpose computer, microprocessor, digital signal processor (DSP) and processor based on multi-core processing architecture, which are non-limiting examples only.

When the entity 1000 is configured as a transmitting device, in some embodiments, the processor 1001 is configured to generate a main preamble sequence and an auxiliary preamble sequence, and the antenna 1004 is configured to transmit the generated main preamble sequence and auxiliary preamble sequence.

When the entity 1000 is configured as a receiving device, in some embodiments, the antenna 1004 is configured to receive a preamble based reference signal on a predefined resource, and the processor 1001 is configured to estimate a channel according to the received preamble based reference signal and the predefined preamble based reference signal. The received preamble based reference signal is constituted of the main preamble sequence, an interference generated by the main preamble sequence, an interference generated by an auxiliary preamble sequence and an interference generated by a data signal, and the predefined resource is a resource on which the main preamble sequence is transmitted.

It should be appreciated that, each unit in the entity 1000 is configured for implementing the exemplary embodiments in the present application. Therefore, the above operations and feathers described in connection to the drawings are also applicable to the entity 1000 and the units therein, and a detailed description thereof will be omitted herein.

The modules described in the embodiments of the present invention can be implemented using certain hardware, software, or a combination thereof. In addition, the modules described herein may be implemented in a processor. For example, it may be described as: a processor, comprising a main preamble sequence generating unit. The names of these modules in some cases do not intend to introduce any limitation to the modules themselves. For example, the main preamble sequence generating unit may also be described as "a unit for generating the main preamble sequence".

In addition, there is provided a computer readable storage media, which may be the computer readable storage media involved in a base station or a user's device as discussed in the above, or a computer readable storage media individually exists rather than being fitted into any end. There is one or more computer programs stored on the computer readable storage media, and one or more processors run the one or more computer programs to perform the method for transmitting or receiving signals based on a filter bank.

The above description is only the preferred embodiments of the present application and the description of the principles of applied techniques. It will be appreciated by those skilled in the art that, the scope of the claimed solutions as disclosed in the present application are not limited to those consisted of particular combinations of features described above, but should cover other solutions formed by any combination of features from the foregoing or an equivalent thereof without departing from the inventive concepts, for example, a solution formed by replacing one or more features as discussed in the above with one or more features with similar functions disclosed (but not limited to) in the present application.

The invention claimed is:

1. A method for transmitting a preamble based reference signal, comprising:
    generating a main preamble sequence;
    generating an auxiliary preamble sequence so that a synthesized signal of the main preamble sequence and the auxiliary preamble sequence is equal to a predefined preamble based reference signal on a predefined resource where the main preamble sequence is transmitted; and
    transmitting the main preamble sequence and the auxiliary preamble sequence based on a filter-bank multicarrier modulation on a plurality of continuous subcarrier resources,
    wherein the synthesized signal on the predefined resource is synthesized by the main preamble sequence, an interference generated by the main preamble sequence, an interference generated by the auxiliary preamble sequence and an interference generated by a data signal.

2. The method as claimed in claim 1,
    wherein the generating the auxiliary preamble sequence comprises:
    calculating the auxiliary preamble sequence, so that a sum of the main preamble sequence, the interference generated by the main preamble sequence, the interference generated by the auxiliary preamble sequence and the interference generated by the data signal is, on the predefined resource, equal to the predefined preamble based reference signal, and wherein the interferences are interferences between different subcarriers based on the filter-bank multi-carrier modulation.

3. The method as claimed in claim 1, wherein the transmitting the auxiliary preamble sequence comprises:
transmitting the auxiliary preamble sequence alone on an allocated resource; or
transmitting the auxiliary preamble sequence superimposed with a data signal on the allocated resource, and
wherein the auxiliary preamble sequence is structurally symmetrical or asymmetrical to the main preamble sequence.

4. The method as claimed in claim 1, wherein the generating the main preamble sequence comprises:
extracting a real part or an imaginary part from the predefined preamble based reference signal to generate the main preamble sequence.

5. A method for receiving a preamble based reference signal, comprising:
receiving the preamble based reference signal on a predefined resource where a main preamble sequence is transmitted, wherein the preamble based reference signal is constructed by the main preamble sequence, an interference generated by the main preamble sequence, an interference generated by an auxiliary preamble sequence and an interference generated by a data signal; and
estimating a channel according to the received preamble based reference signal and a predefined preamble based reference signal,
wherein the main preamble sequence and the auxiliary preamble sequence are transmitted based on a filter-bank multi-carrier modulation on a plurality of continuous subcarrier resources.

6. The method as claimed in claim 5, wherein, when the auxiliary preamble sequence is structurally symmetrical to the main preamble sequence, and the auxiliary preamble sequence and the data signal are superimposed on a same resource for transmission, the method further comprises:
receiving signals on a resource where the auxiliary preamble sequence is transmitted, and combining the received signals to recover the data signal.

7. A transmitter, comprising:
a processor configured to generate a main preamble sequence and generate an auxiliary preamble sequence so that a synthesized signal of the main preamble sequence and the auxiliary preamble sequence is equal to a predefined preamble based reference signal on a predefined resource where the main preamble sequence is transmitted; and
an antenna configured to transmit the main preamble sequence and the auxiliary preamble sequence based on a filter-bank multi-carrier modulation on a plurality of continuous subcarrier resources,
wherein the synthesized signal on the predefined resource is synthesized by the main preamble sequence, an interference generated by the main preamble sequence, an interference generated by the auxiliary preamble sequence and an interference generated by a data signal.

8. The transmitter as claimed in claim 7, wherein the processor is configured to generate the auxiliary preamble sequence by:
calculating the auxiliary preamble sequence, so that a sum of the main preamble sequence, the interference generated by the main preamble sequence, the interference generated by the auxiliary preamble sequence and the interference generated by the data signal is, on the predefined resource, equal to the predefined preamble based reference signal, and
wherein the interferences are interferences between different subcarriers based on the filter-bank multi-carrier modulation.

9. The transmitter as claimed in claim 7, wherein the antenna is configured to,
transmit the auxiliary preamble sequence alone on an allocated resource, or
transmit the auxiliary preamble sequence superimposed with a data signal on the allocated resource, and
wherein the auxiliary preamble sequence is structurally symmetrical or asymmetrical to the main preamble sequence.

10. The transmitter as claimed in of claim 7, wherein the processor is configured to generate the main preamble sequence by:
extracting a real part or an imaginary part from the predefined preamble based reference signal to generate the main preamble sequence.

11. The transmitter as claimed in claim 7, wherein the antenna is configured to:
transmit the main preamble sequence and the auxiliary preamble sequence on a plurality of continuous subcarrier resources, or transmit the main preamble sequence and the auxiliary preamble sequence at different antenna ports, wherein the predefined preamble based reference signals used at the different antenna ports are orthogonal or quasi-orthogonal to each other.

12. A receiver, comprising:
an antenna configured to receive a preamble based reference signal on a predefined resource where a main preamble sequence is transmitted, wherein the preamble based reference signal is constructed by the main preamble sequence, an interference generated by the main preamble sequence, an interference generated by an auxiliary preamble sequence and an interference generated by a data signal; and
a processor configured to estimate a channel according to the received preamble based reference signal and a predefined preamble based reference signal,
wherein the main preamble sequence and the auxiliary preamble sequence are transmitted based on a filter-bank multi-carrier modulation on a plurality of continuous subcarrier resources.

13. The receiver as claimed in claim 12, wherein, when the auxiliary preamble sequence is structurally symmetrical with respect to the main preamble sequence, and the auxiliary preamble sequence and the data signal are superimposed on a same resource for transmission, the antenna is further configured to receive signals on a resource where the auxiliary preamble sequence is transmitted and the processor is further configured to combine the received signals on the resource where the auxiliary preamble sequence is transmitted to recover the data signal.

* * * * *